(12) United States Patent
Jain et al.

(10) Patent No.: US 12,192,061 B2
(45) Date of Patent: Jan. 7, 2025

(54) NETWORK VISUALIZATION SYSTEM AND METHOD OF THE SAME

(71) Applicant: RAKUTEN SYMPHONY, INC., Tokyo (JP)

(72) Inventors: Rahul Jain, Madhya Pradesh (IN); Tarun Mishra, Madhya Pradesh (IN); Vishal Parashar, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/758,355

(22) PCT Filed: May 6, 2022

(86) PCT No.: PCT/US2022/028005
§ 371 (c)(1),
(2) Date: Jul. 4, 2022

(87) PCT Pub. No.: WO2023/214973
PCT Pub. Date: Nov. 9, 2023

(65) Prior Publication Data
US 2024/0171468 A1   May 23, 2024

(51) Int. Cl.
H04L 12/28 (2006.01)
H04L 41/12 (2022.01)
H04L 41/22 (2022.01)
H04L 41/5009 (2022.01)
H04W 24/04 (2009.01)
H04W 24/08 (2009.01)

(52) U.S. Cl.
CPC ............ H04L 41/12 (2013.01); H04L 41/22 (2013.01); H04L 41/5009 (2013.01); H04W 24/04 (2013.01); H04W 24/08 (2013.01)

(58) Field of Classification Search
CPC ..... H04L 41/12; H04L 41/22; H04L 41/5009; H04W 24/04; H04W 24/08
See application file for complete search history.

(56) References Cited

U.S. PATENT DOCUMENTS

2016/0216855 A1* 7/2016 Choudhary .......... G06F 16/9038
2018/0115958 A1* 4/2018 Raghavan ............ H04B 7/0695
(Continued)

FOREIGN PATENT DOCUMENTS

EP          3306987 A1 * 4/2018
WO    WO-2018065865 A1 * 4/2018 ............ H04W 16/00
(Continued)

Primary Examiner — Thai Dinh Hoang
(74) Attorney, Agent, or Firm — HAUPTMAN HAM, LLP

(57) ABSTRACT

A method of network visualization that includes receiving key performance indicator (KPI) data inputs collected for nodes included in a Radio Access Network (RAN); filtering the KPI data to remove unreliable KPI data inputs; determining whether the KPI data inputs for a predetermined geographic area exceeds a threshold sample count; causing a graphical user interface (GUI) to be output by a user interface (UI), the GUI including a display of a shape, corresponding to the predetermined geographic area, layered over a map, where the shape represents an indication of network coverage quality, based on the filtered KPI data inputs, for a location corresponding to the shape corresponding to the predetermined geographic area.

20 Claims, 10 Drawing Sheets

(56) References Cited

U.S. PATENT DOCUMENTS

| | | | |
|---|---|---|---|
| 2018/0206135 A1* | 7/2018 | Chow | H04L 43/20 |
| 2018/0227198 A1* | 8/2018 | Walsh | H04L 43/045 |
| 2020/0154285 A1 | 5/2020 | Sturgeon et al. | |
| 2022/0150752 A1* | 5/2022 | Balasubramanian | H04W 28/0289 |
| 2023/0053339 A1* | 2/2023 | Vivanco | H04W 76/18 |
| 2023/0164590 A1* | 5/2023 | Yamine | H04W 4/021 370/329 |
| 2023/0422071 A1* | 12/2023 | Ramachandra | H04W 24/10 |

FOREIGN PATENT DOCUMENTS

| | | | | |
|---|---|---|---|---|
| WO | WO-2021107491 A1 * | 6/2021 | | H04B 17/12 |
| WO | 2021190726 A1 | 9/2021 | | |
| WO | WO-2023214973 A1 * | 11/2023 | | H04L 41/12 |
| WO | WO-2023249629 A1 * | 12/2023 | | G09G 5/00 |

* cited by examiner

NETWORK VISUALIZATION SYSTEM AND METHOD OF THE SAME

RELATED APPLICATIONS

The present application is a National Phase of International Application No. PCT/US2022/028005, filed May 6, 2022.

BACKGROUND

A cellular network is a telecommunication system of mobile devices (e.g., mobile phone devices) that communicate by radio waves through a local antenna at a cellular base station (e.g., cell tower). The coverage area in which service is provided is divided into small geographical areas called "cells". Each cell is served by a separate low power multi-channel transceiver and antenna at the cell tower. Mobile devices within a cell communicate through that cell's antenna on multiple frequencies and on separate frequency channels assigned by the base station from a common pool of frequencies used by the cellular network.

A Radio Access Network (RAN) is part of the telecommunication system. The RAN implements radio access technology. RANs reside between devices such as a mobile phone, a computer, or any remotely controlled machine and provides connection with its Core Network (CN). Depending on the standard, mobile phones and other wireless connected devices are varyingly known as User Equipment (UE), terminal equipment, Mobile Station (MS), and the like.

BRIEF DESCRIPTION OF THE DRAWINGS

Aspects of the present disclosure are best understood from the following detailed description read with the accompanying FIG. 1n accordance with the standard practice in the industry, various features are not drawn to scale. In fact, the dimensions of the various features are arbitrarily increased or reduced for clarity of discussion.

DETAILED DESCRIPTION

Figure 1:
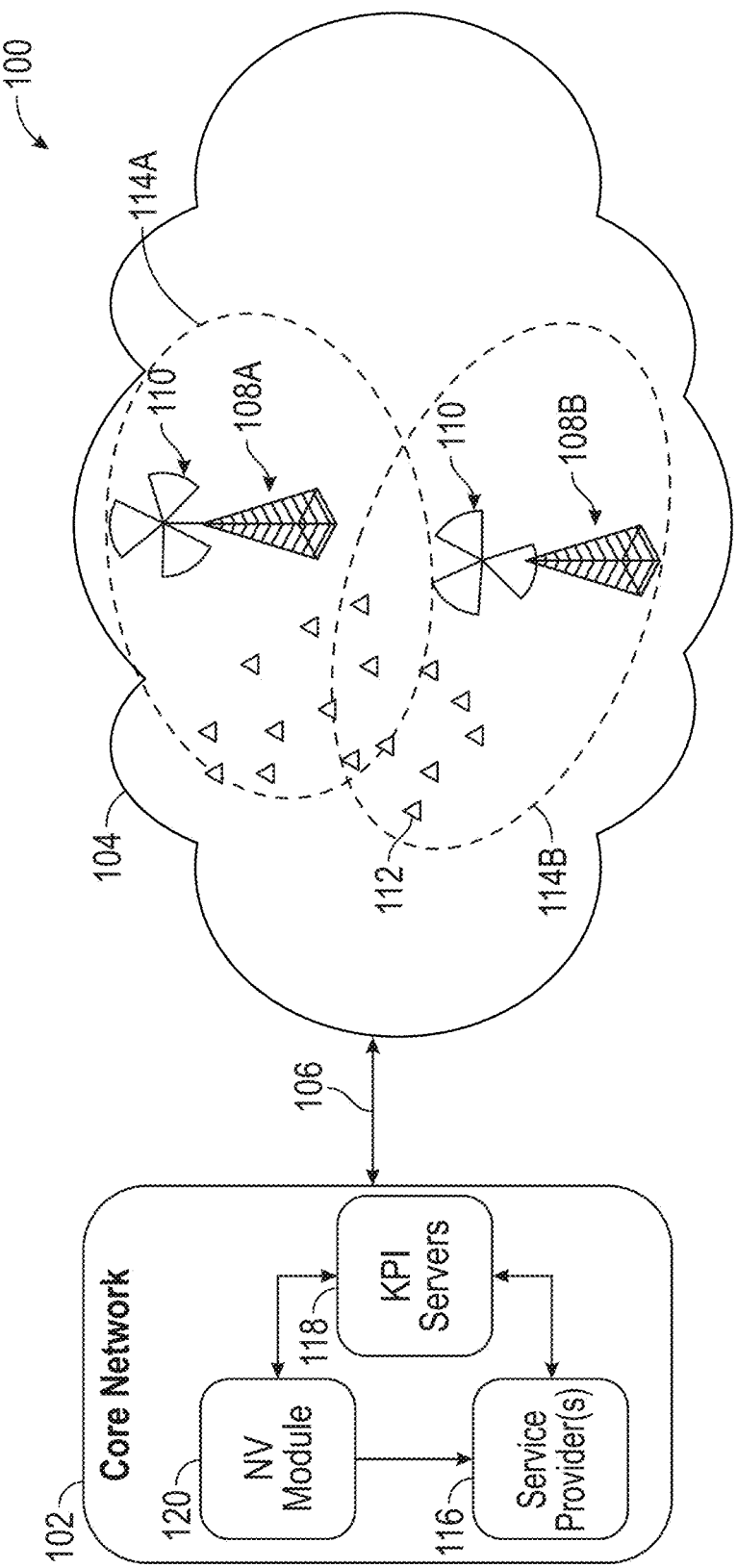
FIG. 1 is a diagrammatic representation of a Network Visualization (NV) system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features be formed between the first and second features, such that the first and second features are unable to make direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a system and method for network visualization is discussed. In some embodiments, the system and method are configured to use data analysis for real-time network visualization.

Telecommunications operators use information about network performance, user experience (UX), and network reachability (e.g., used to understand whether UE is offline or online and using Wi-Fi or mobile data) to analyze and monitor a network and repair a coverage gap (e.g., areas where users can't receive a signal from an access point) before the coverage gap significantly affects the UX. To improve network performance, reliable and well-organized analytics allow engineers to make decisions based on geographical coverage areas.

In some embodiments, a user (e.g., an engineer or network executive) enables a network visualization (NV) module. In some embodiments, the network performance and reachability are monitored through shaped layer presentations (e.g., shaped layers include hexagons, circles, rectangles, or other suitable shapes within embodiments of the present disclosure). In some embodiments, network performance in a cluster or a geographical area is analyzed based on the shaped layer presentation. In some embodiments, data filtration configured to be used for the shaped layer presentation is based on network use. In some embodiments, regular data updating, and visualization is based on crowd-source collected data to determine the current UX. In some embodiments, a user accesses the NV module through the world wide web (WWW) and/or in mobile view (e.g., accessed on a UE).

In some embodiments, a NV module provides daily updates on network performance. In some embodiments, a NV module provides network reachability on daily basis. In some embodiments, a NV module provides indoor and outdoor network performance analysis. In some embodiments, a NV module provides an understanding of user density in an area. In some embodiments, a NV module provides troubleshooting for bad coverage areas and optimizes the network. In some embodiments, a NV module provides radio frequency (RF) engineers with useful tools while determining bad coverage areas. In some embodiments, a NV module allows executives to search geographical areas and visualize network coverage analytics from anywhere in the world. In some embodiments, a NV module provides analytics for a cluster, a city, a zone, or other suitable region within embodiments of the present disclosure. In some embodiments, a NV module provides for network planning in a new coverage area. In some embodiments, a NV module provides a customer care portal with useful information for network customers.

FIG. 1 is a diagrammatic representation of a network visualization (NV) system 100, in accordance with some embodiments.

NV system 100 includes a CN 102 communicatively connected to RAN 104 through backhaul 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and NV module 120.

CN 102 (also known as a backbone) is a part of a computer network which interconnects networks, providing a path for the exchange of information between different Local Area Networks (LANs) or subnetworks. In some embodiments, CN 102 ties together diverse networks over wide geographic areas, in different buildings in a campus environment, or in the same building.

In some embodiments, RAN 104 is a GSM RAN, a GSM/EDGE RAN, a UMTS RAN (UTRAN), an E-UTRAN, Open RAN (O-RAN), virtual RAN (v-Ran), or a Cloud-RAN (C-RAN). RAN 104 resides between user equipment 112 (e.g., mobile phone, a computer, or any remotely controlled machine) and CN 102. RAN 104 is shown as a C-RAN for purposes of simplified representation and discussion. In some embodiments, Base Band Units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, backhaul portion 106 of NV system 100 comprises the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. The connection between base station 108 and UE 112 begins with backhaul 106 connected to CN 102. In some embodiments, backhaul 106 includes wired, fiber optic and wireless components. Wireless sections include using microwave bands, mesh, and edge network topologies that use a high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a Remote Radio Head (RRH), primary and backup electrical power sources, and sheltering. Base stations are known by other names such as base transceiver station, mobile phone mast, or cell tower. In some embodiments, base stations are replaced or used in cooperatively with edge devices configured to wirelessly communicate with UEs. The edge device provides an entry point into service provider CNs, such as CN 102. Examples include routers, routing switches, Integrated Access Devices (IADs), multiplexers, and a variety of Metropolitan Area Network (MAN) and Wide Area Network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90° or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or Ultra-High Frequency (UHF) frequencies (300 MHz to 3 GHz). In other examples, antenna(s) 110 are chosen for their size and directional properties. In some embodiments, the antenna(s) 110 are MIMO (Multiple-Input, Multiple-Output) antenna that send and receive greater than one data signal simultaneously over the same radio channel by exploiting multipath propagation.

In some embodiments, UEs 112 are a computer or computing system. Additionally or alternatively, UEs 112 have a Liquid Crystal Display (LCD), Light-Emitting Diode (LED) or Organic Light-Emitting Diode (OLED) screen interface providing a touchscreen interface with digital buttons and keyboard or physical buttons along with a physical keyboard. In some embodiments, UE 112 connects to the Internet and interconnects with other devices. Additionally or alternatively, UE 112 incorporates integrated cameras, the ability to place and receive voice and video telephone calls, video games, and Global Positioning System (GPS) capabilities. Additionally or alternatively, UEs run Operating Systems (OS) that allow third-party apps specialized for capabilities to be installed and run. In some embodiments, UEs 112 are a computer (such as a tablet computer, netbook, digital media player, digital assistant, graphing calculator, handheld game console, handheld Personal Computer (PC), laptop, Mobile Internet Device (MID), Personal Digital Assistant (PDA), pocket calculator, portable medial player, or ultra-mobile PC), a mobile phone (such as a camera phone, feature phone, smartphone, or phablet), a digital camera (such as a digital camcorder, or Digital Still Camera (DSC), Digital Video Camera (DVC), or front-facing camera), a pager, a Personal Navigation Device (PND), a wearable computer (such as a calculator watch, smartwatch, head-mounted display, earphones, or biometric device), or a smart card.

In at least one embodiment, geographic coverage cells 114 are of any shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate. Coverage depends on several factors, such as orography (i.e., mountains) and buildings, technology, radio frequency and perhaps most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal. Coverage gaps are caused by most anything such as faulty equipment, bad weather, animals, accidents, and the like. Coverage gaps occur through the loss of one or more sets of transmitters, receivers, transceivers, digital signal processors, control electronics, GPS receivers, primary and backup electrical power sources, and antennas. Additionally or alternatively, coverage gaps exist because of areas never previously covered by cellular service or created by removal of a base station or the like. In some embodiments, coverage gaps develop after the service covering an area is lost for any reason. In other examples, a coverage gap is any area without any cell coverage service to UE for whatever reason.

Service provider(s) 116 are businesses, vendors, or organizations that sell bandwidth or network access by providing direct Internet backbone access to Internet service providers and usually access to its Network Access Points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

KPI servers 118 produce both predictions and live network data. Live-network data (KPIs, UE/cell/MDT (Minimization of Drive Test) traces, and crowdsourced data) allows for modelling of network traffic, hot-spot identification, and radio signal propagation. RF drive testing is a method of measuring and assessing the coverage, capacity, and Quality of Service (QoS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber would experience in any specific area, wireless carriers make directed changes to their networks that provide better coverage and service to their customers. Drive testing commonly is configured with a mobile vehicle outfitted with drive testing measurement equipment. The equipment is usually highly specialized electronic devices that interface to Original Equipment Manufacturer (OEM) mobile handsets (UEs). This ensures measurements are realistic and comparable to actual user experiences.

UE/cell/MDT traces collected at the Operations Support Systems (OSS) or through dedicated tools provide service provider(s) 116 with user-level information. Once geo-located, UE/cell/MDT traces are used to enhance path-loss calculations and prediction plots, as well as to identify and locate problem areas and traffic hotspots. KPI servers 118 allow service provider(s) 116 to use UE/cell/MDT traces along with NV module 120 for network visualization.

In some embodiments, NV module 120 gathers the Reference Signal Received Power (RSRP). RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns). In some embodiments, the RSRP is obtained from KPI servers 118.

In some embodiments, NV module 120 gathers the Synchronization Signal reference signal received power (SS-RSRP). SS-RSRP is defined as the linear average over the power contributions (in Watts) of the resource elements that carry secondary synchronization signal (SSS). SS-RSRP is the linear average of the received SSS level. The synchronization signals, which are specific to each cell, are transmitted using the source elements. RSRP makes possible the comparison of the strengths of signals from individual cells in 5G networks. RSRP is a parameter for cell selection or handover. SS-RSRP is the equivalent of the RSRP parameter used in LTE systems.

In some embodiments, NV module 120 gathers the Signal-to-Interference-plus-Noise Ratio (SINR) is a quantity used to give theoretical upper bounds on channel capacity (or the rate of information transfer) in wireless communication systems. Analogous to the Signal-to-Noise Ratio (SNR) used often in wired communications systems, the SINR is defined as the power of a certain signal of interest divided by the sum of the interference power (from the other interfering signals) and the power of some background noise.

In some embodiments, NV module 120 gathers the synchronization signal Signal-to-Interference-plus-Noise Ratio (SS-SINR) which is the linear average over the power contribution (in Watts) of the resource elements carrying SSS divided by the linear average of the noise and interference power contribution (in Watts) over the resource elements carrying SSS within the same frequency bandwidth. SS-SINR is the linear average over the power contribution of the resource elements carrying secondary synchronization signals divided by the linear average of the noise and interference power contribution over the resource elements carrying secondary synchronization signals within the same frequency bandwidth (i.e., ETSI TS 138 215 V15.2.0 herein incorporated by reference in entirety). In LTE networks SINR reported as a code via measurement report to eNodeB (e.g., access point). This is a difference between 3G and 4G.

In some embodiments, NV module 120 gathers data throughput. When used in the context of communication networks, such as Ethernet or packet radio, throughput or network throughput is the rate of successful message delivery over a communication channel. The data these messages belong to are delivered over a physical or logical link or pass through a certain network node. Throughput is usually measured in bits per second (bit/s or bps), and sometimes in data packets per second (p/s or pps) or data packets per time slot. Throughputs include downlink and uplink data transmission. The radio downlink is the transmission path from a cell site to the UE. The radio uplink is the transmission path from the mobile station (UE) to a base station.

In some embodiments, NV module 120 gathers information regarding latency. Network delay is a design and performance characteristic of a telecommunications network. Network delay specifies the latency for a bit of data to travel across the network from one communication endpoint to another. Latency is typically measured in multiples or fractions of a second. Delay differs slightly, depending on the location of the specific pair of communicating endpoints. Engineers usually report both the maximum and average delay, and they divide the delay into several parts: (1) such as processing delay which is the time a router takes to process the packet header; (2) queuing delay which is the time the packet spends in routing queues; (3) transmission delay which is the time taken to push the packet's bits onto the link; (4) propagation delay which is the time for a signal to propagate through the media. A certain minimum level of delay is experienced by signals due to the time it takes to transmit a packet serially through a link. This delay is extended by more variable levels of delay due to network congestion. IP network delays range from a few milliseconds to several hundred milliseconds.

In some embodiments, NV module 120 gathers information from layer three (network layer) drives. The network layer is responsible for receiving frames from the data link layer and delivering them to their intended destinations based on the addresses contained inside the frame. The network layer finds the destination by using logical addresses, such as IP (internet protocol). At this layer, routers are a component used to route information where it needs to go between networks.

In some embodiments, NV module 120 gathers information from a consumer on the network, such as RAN 104. NV module 120 gathers active and passive connectivity (e.g., reachability). In some embodiments, NV module 120 gathers information from a web performance test (WPT). In some embodiments, the NV module 120 captures signal KPIs during the execution of WPT and uses the signal KPIs for the creation of shaped layer presentations on a map. In some embodiments, the NV module 120 gathers information from YouTube, a network drive, feedback, or 1C drive information. In some embodiments, NV module 120 collects active and passive data from subscribers and/or users. In a non-limiting example, network quality, related parameters, SINR, RSRP, data throughput, and other suitable parameters within the scope of the invention.

Figure 9:
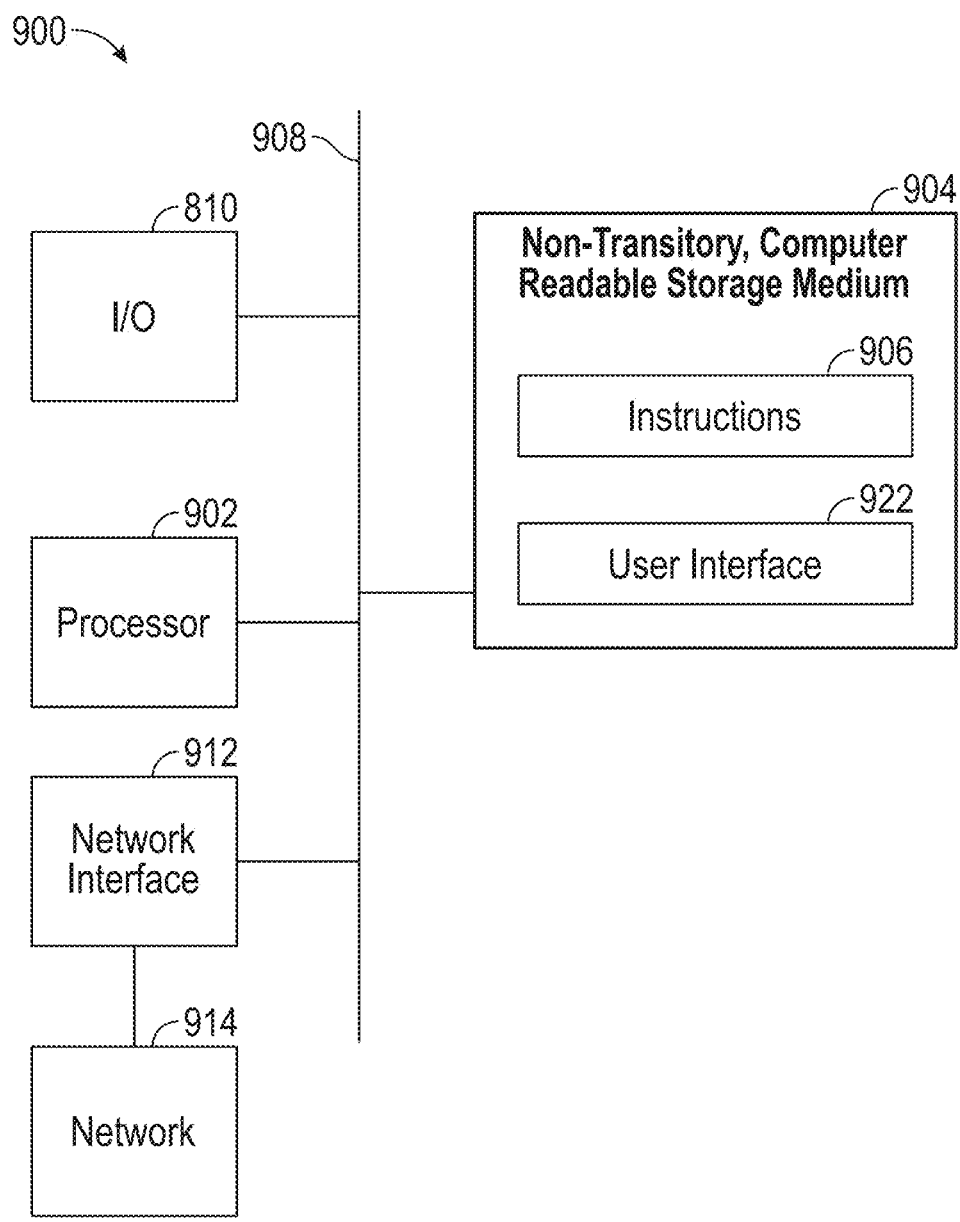
FIG. 9 is a high-level functional block diagram of a processor-based system, in accordance with some embodiments.

In some embodiments, NV module 120 gathers geo-located KPI sample data. In some embodiments, this geo-located data is provided by KPI servers 118. In some embodiments, the geo-located sample data is provided by a database or memory, such as memory 904 (FIG. 9). In some embodiments, the geo-located data includes serving ENodeB ID (i.e., the identifier of the node at the base station). In some embodiments, the geo-located data is provided and/or collected through drive testing, UE KPIs reported by the UE, such as UEs 112, base station KPI reporting through Central Units (CU) or Distribution Units (DU) associated with a base station, such as base stations 108, or other suitable methods of collecting geo-located data in accordance with some embodiments. For the purposes of discussion, each device providing KPI information is referred to herein as a node (e.g., antenna, edge devices, UEs, or other suitable devices within embodiments of the present disclosure).

In some embodiments, NV module 120 gathers the Physical Cell ID (PCI). PCI used to indicate the physical layer identity of a cell. The PCI is used for cell identity during cell selection procedure. The purpose of PCI optimization is to ensure to a great extent that neighboring cells have different primary sequences allocated. Good PCI assignment reduces call drops by enabling UE to clearly distinguish one cell from another.

In some embodiments, NV module 120 gathers the latitude and longitude of the node (e.g., gNB), NAP, base station 108, or edge device through a location tag.

In some embodiments, NV module 120 geo bins the collected data. As the data collection occurs, NV module 120 performs a binning operation on the collected data. In some embodiments, NV module 120 obtains the mean of all the values in a predetermined region. In some embodiments, NV module 120 determines the edges (e.g., NW, SW, NE & SE) of a geographic area, divides the geographic area into a shape, such as hexagons, looks up values within each shape, computes an average (mean), and attributes the mean to the latitude and longitude at the center of the shape.

Figure 2:
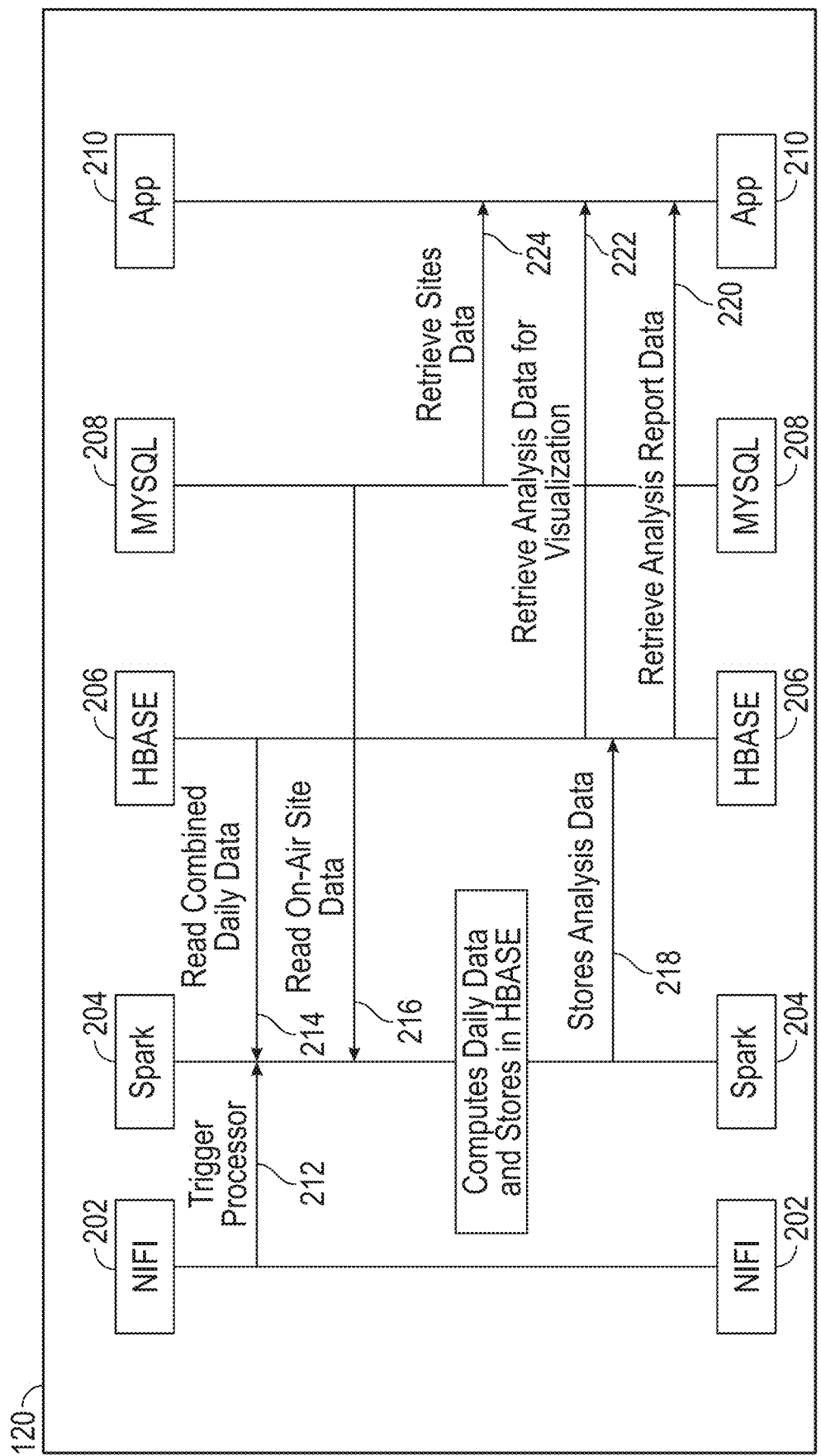
FIG. 2 is a data flow diagram of a NV module, in accordance with some embodiments.

FIG. 2 is a data flow diagram of a NV module 120, in accordance with some embodiments.

NV module 120 includes a NIFI component 202, a Spark component 204, an Hbase-component 206, a MySQL component 208, and an Application component 210.

In some embodiments, NIFI-component 202 automates the flow of data between NV module 120 and KPI servers 118. NIFI-component 202 ingests data from third party applications, the data including latitude and longitude for each base station, such as base station 108, frequency band details, eNB ID, evolved-UTRAN cell global identifier (ECGI), drive test data, KPIs, consumer data and other suitable data in accordance with some embodiments. In some embodiments, NIFI-component 202 is an open-source platform based on the concept of extract, transform, and load. The software design is based on the flow-based programming model and offers features that include the ability to operate within clusters, security using Transport Layer Security (TLS) encryption, extensibility (e.g., users can write their own software to extend its abilities) and improved usability features like a portal which is used to view and modify behavior visually. NIFI-component 202 is used to schedule jobs, trigger flow, and ingest data from third-party applications like raw files from KPI servers 118.

Spark-component 204 is an open-source unified analytics engine for large-scale data processing. Spark-component 204 provides an interface for programming entire server clusters with implicit data parallelism and fault tolerance. Spark-component 204 is a parallel processing framework for running large-scale data analytics applications across clustered computers. Spark-component 204 handles both batch and real-time analytics and data processing workloads.

Hbase-component 206 provides a fault-tolerant way of storing large quantities of sparse data (e.g., small amounts of information caught within a large collection of empty or unimportant data). Hbase-component 206 is a column-oriented non-relational database management system that runs on top of a Hadoop Distributed File System (HDFS). HBase provides a fault-tolerant way of storing sparse data sets, which are common in many big data use cases.

HDFS-component (not shown) is a distributed filesystem that stores data on commodity machines, providing very high aggregate bandwidth across server clusters. All batched data sources are initially stored into HDFS-component and then processed using Spark-component 204. Hbase-component 206 also utilizes HDFS as its data storage infrastructure.

MySQL-component 208 is an open-source Relational Database Management System (RDBMS). A relational database organizes data into one or more data tables in which data types are related to each other and these relations help structure the data. MySQL component 208 creates, modifies, and extracts data from Spark-component 204 at operation 216, as well as controls user access. MySQL-component 208 is utilized for Application Programming Interface (API) retrieval and for serving any real-time User Interface (UI), such as UI 922 (FIG. 9). The aggregated and correlated data is also stored in MySQL.

Figure 6A:
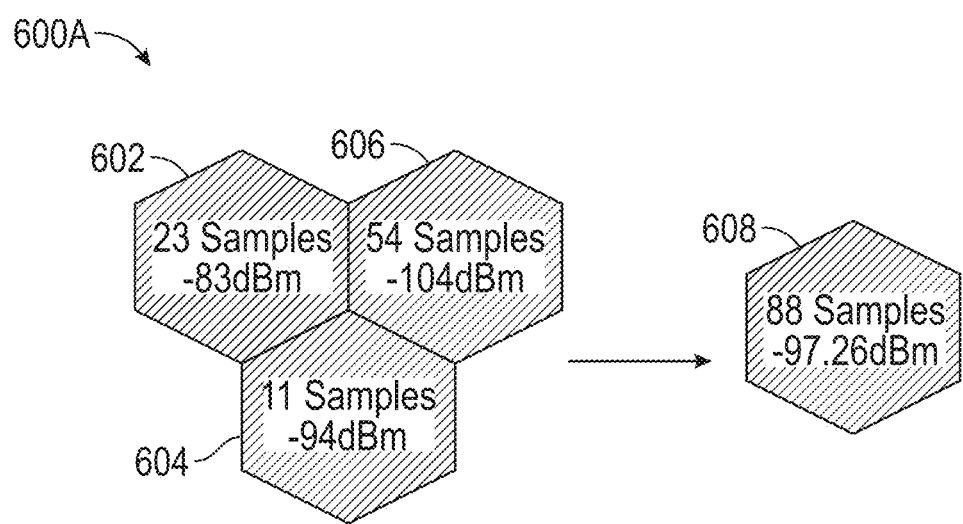
FIG. 6A is a pictorial representation of aggregation of multiple shapes, in accordance with some embodiments.
Figure 6B:
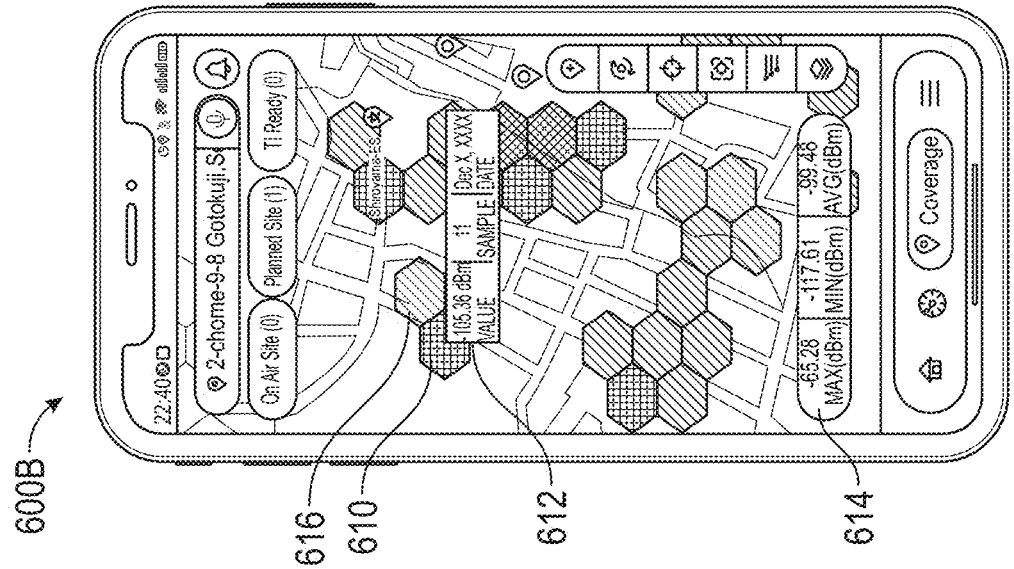
FIGS. 6B, 6C, and 6D are pictorial representations of user equipment user interfaces, in accordance with some embodiments.
Figure 6C:
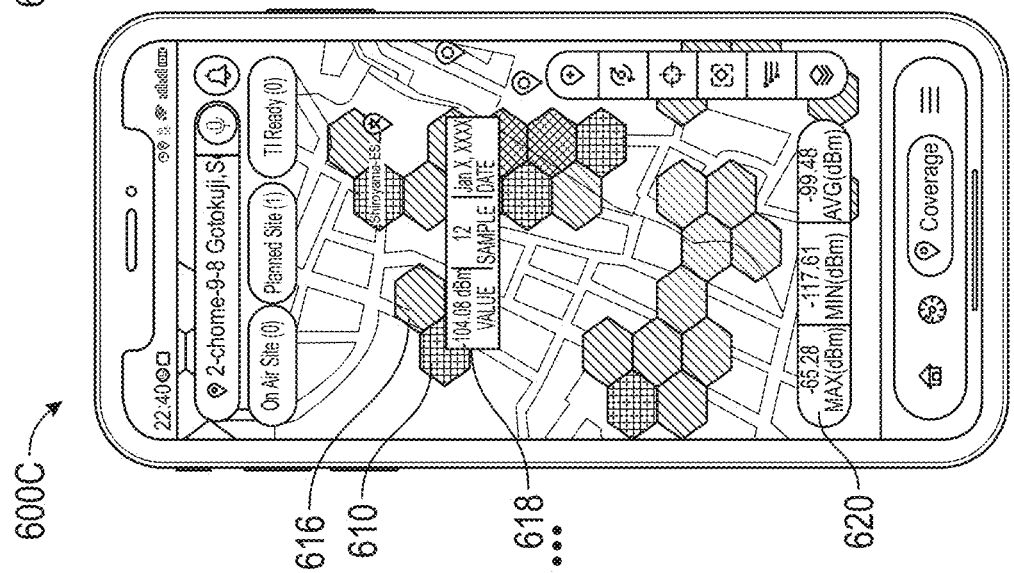
Figure 6D:
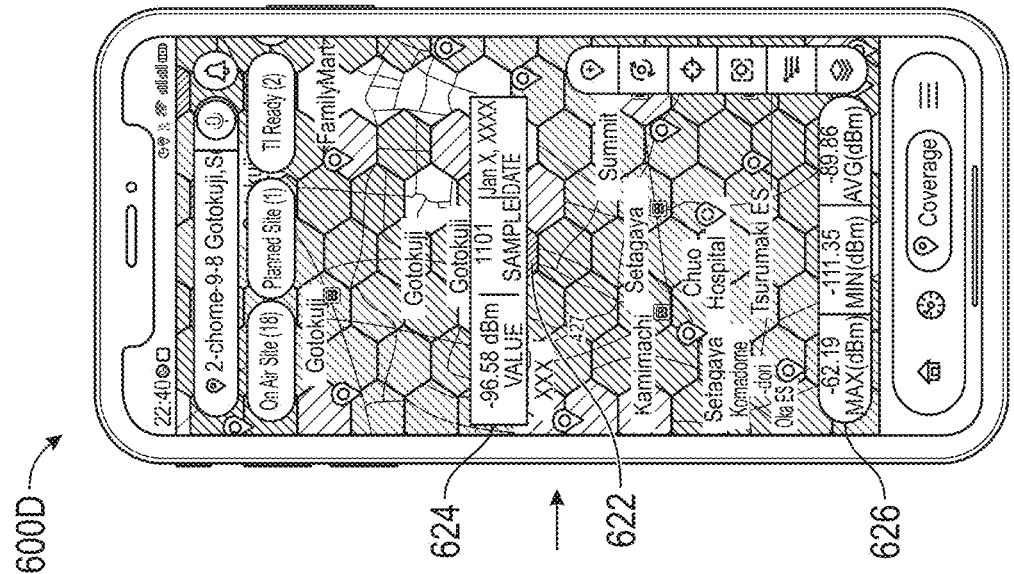

Application component 210 allows a user, through a UI such as UI 922 of FIG. 9 or a UI of a UE (as shown in FIGS. 6B, 6C, and 6D), to visualize the network (e.g., retrieve analysis data for visualization) at operation 222. A user visualizes varying aspects of the NV in real time including analysis report data at operation 220. In some embodiments, a user visualizes specified bands and varying geographic areas. In some embodiments, a user visualizes individual shapes (e.g., hexagonal geographic areas) based on network analysis. For example, a user determines whether a geographic area (represented by a shape layered over a map) is experiencing poor coverage.

In some embodiments, a user drills down into details within a shape. In some embodiments, a user hovers over or clicks on a layered shape and a pop-up box reveals information such as cell ID, cell RSRP, cell SS-RSRP, cell SINR, and the number of samples collected within the grid. In some embodiments, a user visualizes details regarding network performance in each layered shape. For example, the user visualizes in a pop-up box a layered shape RSRP, and the number of sample counts for the layered shape.

At operation 212, spark component 204 retrieves third party data from NIFI component 202. In some embodiments, the inputted third-party data includes site information from a site database, such as a latitude and longitude of all cells in a RAN, frequency band details, eNB ID, ECGI, and other suitable information. In some embodiments, the inputted data additionally includes geo-located data, such as RF drive testing information, UE KPI data or other passively collected data. In some embodiments, the geo-located data is collected over a continually running window of time, such as 24 hours. In some embodiments, the geo-located data is collected over greater than 24 hours and in some embodiments the geo-located data is collected over less than 24 hours. In some embodiments, the window of time for collection of geo-located data is controlled by a sliding window algorithm. In some embodiments, the collected data is collected in a FIFO (First In, First Out) manner whereas new data is collected older data is removed (e.g., data greater than 24 hours old).

Spark component 204 stores the geo-located data in Hbase component 206 and retrieves the stored data at operation 214 to perform a network analysis. At operation 218, Spark component 204 stores the network analysis in Hbase component 206. Continuing with operation 216, MySQL 208 retrieves site information from Spark component 204 and combines the site information for Application 210. Application 210, at operation 222, retrieves the network analysis data from Hbase component 206 for visualization. Application component 210 further retrieves network analysis report data at operation 220 for visualization.

Figure 3:
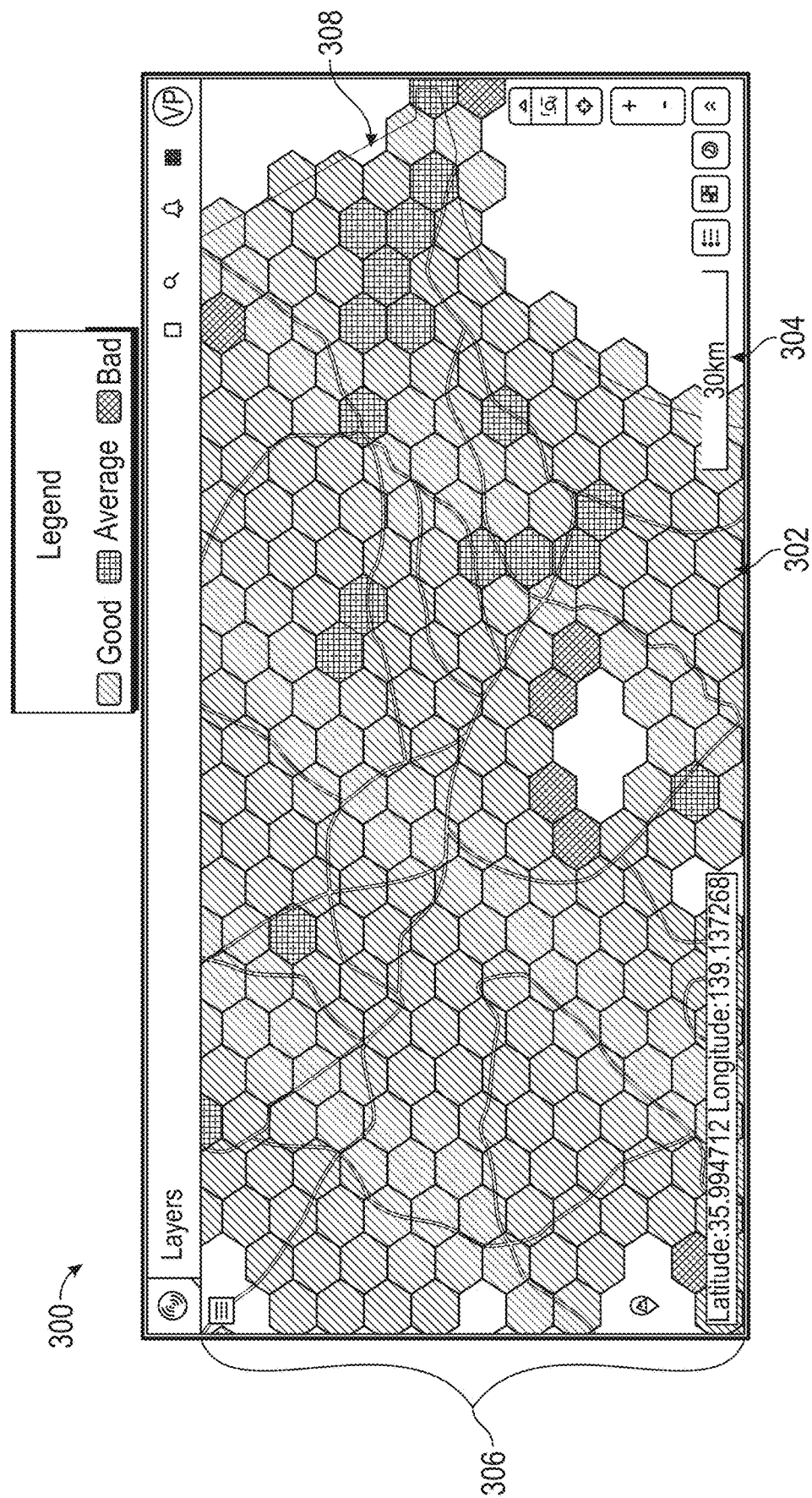
FIG. 3 is a pictorial representation of a network visualization geographic area, in accordance with some embodiments.

FIG. 3 is a pictorial representation of a network visualization geographic area 300, in accordance with some embodiments.

Network visualization geographic area 300 is a representation of the collected data presented by the application discussed above. Network visualization geographic area 300 is divided into hexagons 302 where, in some embodiments, each hexagon 302 represents a geographic area based on scale 304 of network visualization geographic area 300.

Network visualization geographic area 300, including hexagons 302, are layered over map 308, which represents a geographic area of interest. In some embodiments, the hexagons 302 combine to form a grid 306. In some embodiments, hexagons 302 are configured with varying sizes and provide information relating to network coverage quality (e.g., as good, average, or bad). In some embodiments, the size of grids 302 are adjustable by an engineer or user. In some embodiments, grids 302 have varying shapes including circular, square, rectangular. In some embodiments, a user selects a shape of grids 302. In some embodiments, the area of hexagons 302 are based on a level of zoom into network visualization geographic area 300. In table 1 below, the area of hexagons 302 is adjusted based on a zoom level. Continuing with the example of table 1, a pixel grid size is also adjusted for resolution of details within hexagon 302. In some embodiments, as the zoom level increases, the area of the hexagon 302 decreases. In some embodiments, increasing the zoom level, increases the number of pixels in the representation while the hexagon area remains the same. Thus, providing greater visual clarity without increasing the area of hexagon 302.

TABLE 1

| Zoom Level | Area of Hexagon | Grid size in pixels |
|---|---|---|
| 13 | 60 km$^2$ | 48 |
| 14 | 40 km$^2$ | 24 |
| 15 | 40 km$^2$ | 48 |
| 16 | 2.5 km$^2$ | 24 |
| 17 | 2.5 km$^2$ | 48 |

Figure 4:
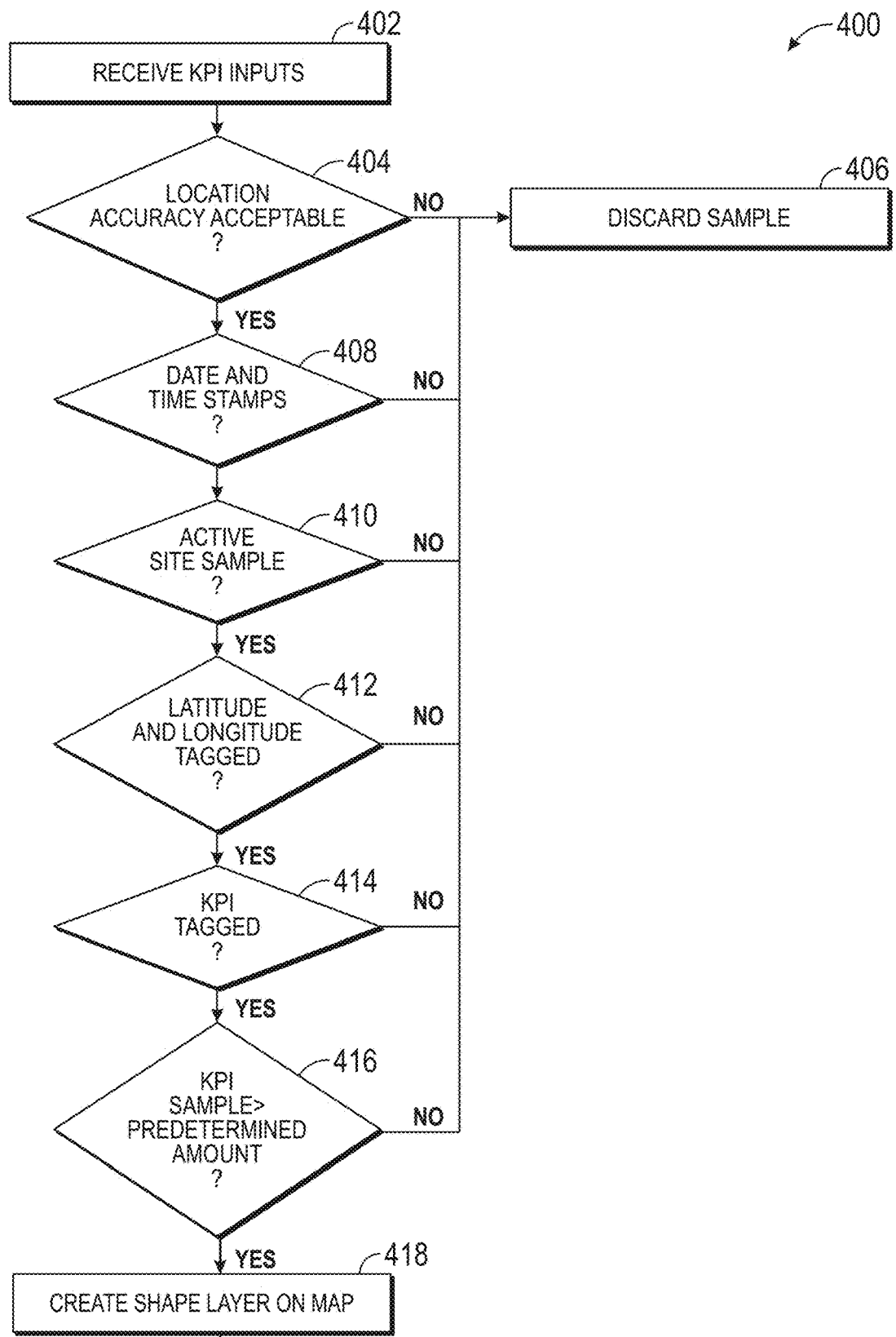
FIG. 4 is a flow diagram representation of a method for NV, in accordance with some embodiments.

FIG. 4 is a flow diagram representation of a method 400 for network visualization (NV), in accordance with some embodiments.

While the operations of method 400 are discussed and shown as having a particular order, each operation in method 400 is configured to be performed in any order unless specifically called out otherwise. Method 400 is implemented as a set of operations, such as operations 402 through 418.

At operation 402 of method 400, KPI data inputs are received. In some embodiments, NIFI component 202 gathers geo-located KPI samples that include serving eNB IDs, NR EARFCNs, PCIs, cell latitude and longitude, cell RSRP, cell SS-RSRP and other suitable geo-located samples in accordance with some embodiments. Operational flow moves from operation 402 to operation 404, where location accuracy is determined.

In operation 404 of method 400, a determination is made as to the location accuracy of the received KPI data samples. In some embodiments, location accuracy is determined based upon a known location of a cell, antenna, UE, or other suitable KPI producing node in embodiments of the present disclosure. In some embodiments, the location accuracy of the KPI data samples is within a threshold (e.g., less than 5 meters) to be acceptable. In some embodiments, in response to the accuracy of the KPI location data being greater than the threshold of known node location data, the KPI location data is not used for network visualization. In response to the location accuracy of a sample being unreliable ("NO" branch of block 404), process flows to operation 406 where the sample is discarded. In response to the location accuracy of a sample being acceptable ("YES" block of operation 404), operation proceeds from operation 404 to operation 408.

In operation 408 of method 400, a determination is made as to whether the data sample has date and time stamps. In some embodiments, KPIs rely on a time stamp as part of their calculation. As part of the check for changed data, the time stamp is also considered. In response to the KPI data sample having no date and/or time stamp ("NO" branch of block 408), process flows to operation 406 where the sample is discarded. In response to the data sample including a date and time stamp ("YES" branch of block 408), operation proceeds from operation 408 to operation 410.

In operation 410 of method 400, a determination is made as to whether the KPI data sample originates from a non-outage node (e.g., an active edge device or base station). In response to the data sample originating from an outage site ("NO" branch of block 410), process flows to operation 406 where the sample is discarded. In response to the data sample originating from an active node ("YES" branch of block 410), operation proceeds from operation 410 to operation 412.

In operation 412 of method 400, a determination is made as to whether the KPI data sample contains a latitude and longitude tag. Geo-tagging is the process of adding geographic information about KPI data, within tags—including latitude and longitude coordinates, place names and/or other positional data. In response to the data sample not having a latitude and longitude tag ("NO" branch of block 412), process flows to operation 406 where the sample is discarded. In response to the data sample including a latitude and longitude tag ("YES" branch of block 412), operation proceeds from operation 410 to operation 412.

In operation 414 of method 400, a determination is made as to whether the data sample KPI is tagged. KPI tags are an abbreviated title with a KPI value. Each KPI has a data source, entity set, and annotation file. The KPI value changes only in response to an action executed on transactional content. In response to the KPI sample not having a tag ("NO" branch of block 412), process flows to operation 406 where the sample is discarded. In response to the data sample including a KPI tag ("YES" branch of block 412), operation proceeds from operation 414 to operation 416.

At operation 416 of method 400, a total number of KPI data samples per layered shape is collected and a determination is made as to whether the KPI samples for the layered shape is greater than a predetermined amount (e.g., enough KPI samples to provide a reliable assessment of network quality). In some embodiments, the total number of data samples per cell is determined by examining the KPI input data in operation 402. In response to less than ten KPI samples existing ("NO" branch of block 416), flow proceeds to operation 406 where the samples are discarded. In response to greater than a predetermined amount KPI samples existing (e.g., over a twenty-four-hour window) ("YES" branch of block 416), process flow moves from operation 416 to operation 418.

In table 2, an example is provided for sample criteria operation 416 is determining.

TABLE 2

| Technology (LTE/5G) | Sample Criteria [Configurable] |
|---|---|
| RSRP/SS-RSRP | 10 |
| SINR/SS-SINR | 10 |
| DL | 5 |
| UL | 5 |
| Latency | 5 |

In some embodiments, operation 416 determines whether 10 RSRP samples, 10 SINR samples, 5 downlink samples, 5 uplink samples, and 5 latency samples are available before proceeding to operation 418. In some embodiments, only one of the sample criteria is met. In some embodiments, a majority or three out of the five sample criteria are available.

At operation 418 of method 400, a layered shape is created on a map, such as network visualization geographic area 300 where hexagons 302 are layered over map 308. In some embodiments, the KPI geo-located data is geo binned. Binning, also called discrete binning or bucketing, is a data pre-processing technique used to reduce the effects of minor observation errors. The original data values which fall into a given small interval, a bin and are replaced by a value representative of that interval, which is often the central value. Binning is a form of quantization. In some embodiments, Spark component 204 performs the geo-binning.

Figure 5:
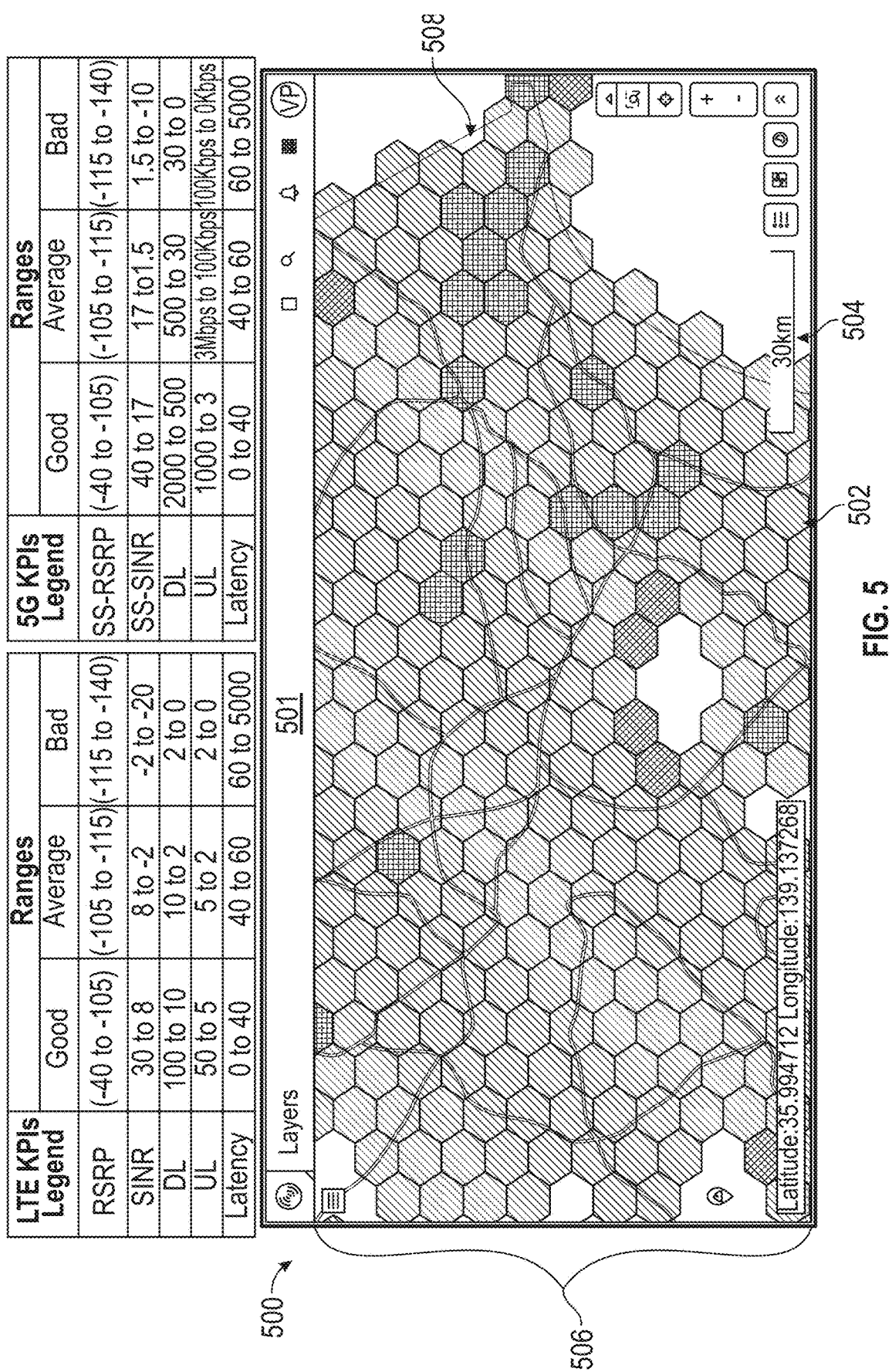
FIG. 5 is a pictorial representation of a NV user interface, in accordance with some embodiments.

FIG. 5 is a pictorial representation of a NV user interface 500, in accordance with some embodiments.

In FIG. 5, graphical user interface (GUI) 500 includes a display 501 that shows hexagons 502 layered over a map 508 representing a geographic area. Hexagons 502 are grouped into a grid 506 and the size of each hexagon 502 is determined by scale 504.

For each hexagon 502 representing good LTE coverage, that is an RSRP of between −40 to −105 dBm (decibels (dB) with reference to one milliwatt (mW)); a SINR of 30 to 8 dB; a downlink rate of 100 to 10 Mbps, an uplink rate of 50 to 5 Mbps, and/or a latency of 0-40 ms.

For each hexagon 502 representing good 5G coverage, that is an SS-RSRP of between −40 to −105 dBm; an SS-SINR of 40 to 17 dB; a downlink rate of 2,000 to 500 Mbps, an uplink rate of 1,000 to 3 Mbps, and/or a latency of 0-40 ms.

For each hexagon 502 representing an average LTE coverage, that is an RSRP of between −105 to −115 dBm; a SINR of 8 to −2 dB; a downlink rate of 10 to 2 Mbps, an uplink rate of 5 to 2 Mbps, and/or a latency of 40-60 ms.

For each hexagon 502 representing an average 5G coverage, that is an SS-RSRP of between −105 to −115 dBm; an SS-SINR of 17 to 1.5 dB; a downlink rate of 500 to 30 Mbps, an uplink rate of 3 Mbps to 100 Kbps, and/or a latency of 40-60 ms.

For each hexagon 502 representing a bad LTE coverage, that is an RSRP of between −115 to −140 dBm; a SINR of −2 to −20 dB; a downlink rate of 2 to 0 Mbps, an uplink rate of 2 to 0 Mbps, and/or a latency of 60-5,000 ms.

For each hexagon 502 representing a bad 5G coverage, that is an SS-RSRP of between −115 to −140 dBm; an SS-SINR of 1.5 to −10 dB; a downlink rate of 30 to 0 Mbps, an uplink rate of 100 to 0 Kbps, and/or a latency of 60-5,000 ms.

FIG. 6A is a pictorial representation of aggregation of multiple layered shapes 600A, in accordance with some embodiments.

As discussed above with reference to table 1, a user zooms in and zooms out on a graphical user interface (GUI) display, such as display 501. In response to a user zooming out to view a larger network coverage, NV module 120 performs an aggregation algorithm to provide coverage data for a layered shape, such as hexagon 502.

The aggregation logic for combining hexagons, based on a decreasing zoom level uses a weighted average algorithm. In a non-limiting example, the RSRP and the number of samples per hexagon, such as hexagons 602, 604, and 606, are used to determine the RSRP of a larger hexagon, such as hexagon 608. In some embodiments, hexagon 608 includes the same or a significant portion of hexagons 602, 604, and 606. Continuing with the example, (23 samples of hexagon 602 are multiplied by −83 dBm) and added to (54 samples of hexagon 606 multiplied by −104 dBm) and added to (11 samples of hexagon 604 multiplied by −94 dBm). Continuing with the example, the sum is divided by the total amount of samples (e.g., 23+54+11) of hexagons 602, 604, and 606. The result, −97.26 dBm, becomes a new RSRP for larger, or zoomed out, hexagon 608. As −97.26 dBm is within a good range for RSRP, hexagon 608 is indicated as a good coverage hexagon. In some embodiments, the initial data for each layered shape is determined at the lowest zoom level and aggregation is performed afterwards.

FIGS. 6B, 6C, and 6D are pictorial representations of user equipment user interfaces, in accordance with some embodiments.

In FIG. 6B, a UE UI 600B is a GUI display of network visualization at a zoom level, for example zoom level 17. A user has selected hexagon 610 which causes hexagon 610 to have a brighter hue compared to the other hexagons surrounding hexagon 610. Further, pop-out box 612 presents the user with an RSRP or SS-RSRP value, for example −105.36 dBm, which, according to the legend of FIG. 5, places hexagon 610 as within an average coverage. Further, hexagon 610 includes 11 samples (e.g., greater than the minimum samples for display) as of the date listed. At the bottom of UI 600B, pop-out box 614 further displays a maximum RSRP, for example −65.28 dBm, a minimum RSRP, for example −117.61 dBm, and an average RSRP, for example −99.48.

In FIG. 6C, a UI 600C displays similar information for hexagon 616, but for a later date, for example UI 600C is displayed on a date 33 days after the date of UI 600B. Hexagon 616 abuts hexagon 610 as shown from UIs 600B and 600C. In FIG. 6C, a user has selected hexagon 616 which will cause hexagon 616 to have a brighter hue compared to the hexagons surrounding hexagon 616. Further, pop-out box 618 presents the user with an RSRP or SS-RSRP value, for example −104.08 dBm, which, according to the legend of FIG. 5, places hexagon 616 as having good coverage. Further, hexagon 616 has 12 samples as of the date listed. At the bottom of UI 600C, pop-out box 620 further displays a maximum RSRP, for example −65.28 dBm, a minimum RSRP, for example −117.61 dBm, and an average RSRP, for example −99.48.

In FIG. 6D, a UI 600D displays a zoomed-out display, for example zoomed out two levels from 17 to 15 (e.g., from 2,500 m² to 40,000 m² in hexagon 622). According to an aggregation logic performed by NV module 120, a weighted average for hexagon 610 and 616 over a period of time between the date of UI 600B (e.g., Dec. 3, 2021) and UI 600C (e.g., Jan. 5, 2022) is performed to develop hexagon 622. That is, the RSRP value in pop-out box 624 is a representation of the sum, over several days, of the average RSRP of hexagon 610 multiplied by the number of samples of hexagon 610 with the average RSRP of hexagon 616 multiplied by the number of samples of hexagon 616, where the sum is divided by the total amount of samples of hexagon 610 and hexagon 616 over the period of time (e.g., 1101 as shown in pop-out box 624) to arrive at the weighted average RSRP of −96.58.

In pop-out box 626, the weighted average is also used to determine a maximum RSRP (e.g., −62.19), a minimum RSRP (e.g., −111.35) and an average RSRP (e.g., −89.86) for hexagon 622.

Figure 7:
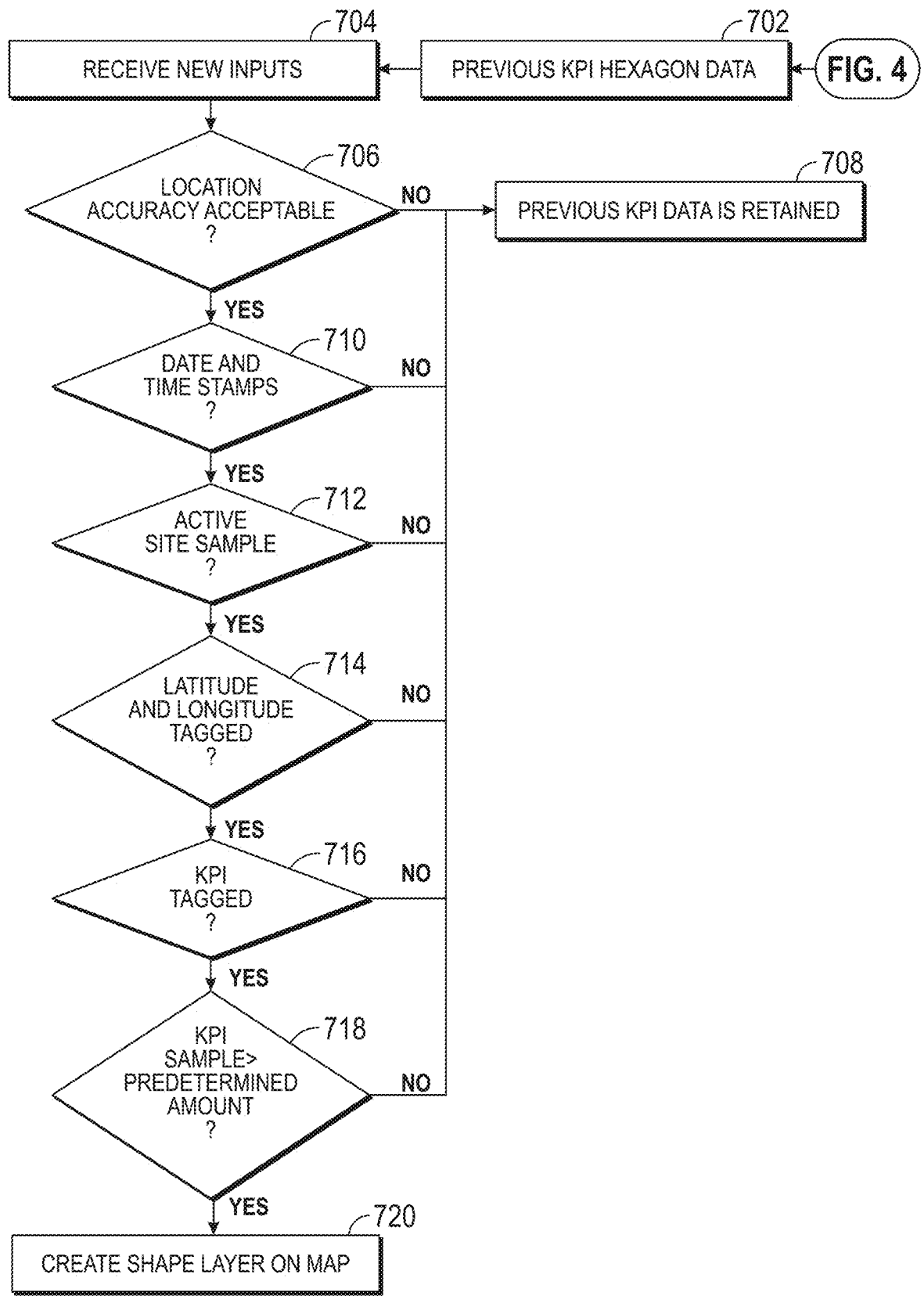
FIG. 7 is a flow diagram representation of a method for NV, in accordance with some embodiments.

FIG. 7 is a flow diagram representation of a method 700 for network visualization (NV), in accordance with some embodiments.

While the operations of method 700 are discussed and shown as having a particular order, each operation in method 700 is configured to be performed in any order unless specifically called out otherwise. Method 700 is implemented as a set of operations, such as operations 702 through 720.

In operation 702 of method 700, previous KPI layered shape data is collected (e.g., determined in method 400 of FIG. 4) from a database or memory, such as non-transitory, computer readable storage medium 904. Operation flow moves from operation 702 to operation 704.

In operation 704 of method 700, current KPI data inputs are received. In some embodiments, NIFI component 202 gathers geo-located KPI samples that include serving eNB IDs, NR EARFCNs, PCIs, cell latitude and longitude, cell RSRP, cell SS-RSRP and other suitable geo-located samples in accordance with some embodiments. Operational flow moves from operation 704 to operation 706, where location accuracy is determined.

In operation 706 of method 700, a determination is made as to the location accuracy of the received KPI data samples. In some embodiments, location accuracy is determined based upon a known location of a cell, antenna, UE, or other suitable KPI producing node in embodiments of the present disclosure. In some embodiments, the location accuracy of the KPI data samples is within a threshold (e.g., less than 5 meters) to be acceptable. In some embodiments, in response to the accuracy of the KPI location data being greater than the threshold of known node location data, the KPI location data is not used for network visualization. In response to the location accuracy of a sample being unreliable ("NO" branch of block 706), process flows to operation 708 where the previous KPI data for the layered shape is retained. In response to the location accuracy of a sample being acceptable ("YES" block of operation 706), operation proceeds from operation 706 to operation 710.

In operation 710 of method 700, a determination is made as to whether the data sample has date and time stamps (tags). In some embodiments, KPIs rely on a time stamp as part of their calculation. As part of the check for changed data, the time stamp is also considered. In response to the KPI data sample having no date and/or time stamp ("NO" branch of block 710), process flows to operation 708 where the previous KPI data for the layered shape is retained. In response to the data sample including a date and time stamp ("YES" branch of block 710), operation proceeds from operation 710 to operation 712.

In operation 712 of method 700, a determination is made as to whether the KPI data sample originates from a non-outage node (e.g., an active edge device or base station). In response to the data sample originating from an outage site ("NO" branch of block 712), process flows to operation 708 where the previous KPI data for the layered shape is retained. In response to the data sample originating from an active node ("YES" branch of block 712), operation proceeds from operation 712 to operation 714.

In operation 714 of method 700, a determination is made as to whether the KPI data sample contains a latitude and longitude tag. Geo-tagging is the process of adding geographic information about KPI data, within tags—including latitude and longitude coordinates, place names and/or other positional data. In response to the data sample not having a latitude and longitude tag ("NO" branch of block 714), process flows to operation 708 where the previous KPI data for the layered shape is retained. In response to the data sample including a latitude and longitude tag ("YES" branch of block 714), operation proceeds from operation 714 to operation 716.

In operation 716 of method 700, a determination is made as to whether the data sample KPI is tagged. KPI tags are an abbreviated title with a KPI value. Each KPI has a data source, entity set, and annotation file. The KPI value changes only in response to an action executed on transactional content. In response to the KPI sample not having a tag ("NO" branch of block 716), process flows to operation 708 where the previous KPI data for the layered shape is retained. In response to the data sample including a KPI tag ("YES" branch of block 716), operation proceeds from operation 716 to operation 718.

At operation 718 of method 700, a total number of KPI data samples per layered shape is collected and a determination is made as to whether the KPI samples for the layered shape is greater than a predetermined amount (e.g., 10 KPI samples to provide a reliable assessment of network quality). In some embodiments, the total number of data samples per cell is determined by examining the KPI input data in operation 704. In response to less than the predetermined amount of KPI samples existing ("NO" branch of block 718), flow proceeds to operation 708 where the previous KPI data for the layered shape is retained. In response to greater than a predetermined amount KPI samples existing (e.g., over a twenty-four-hour window) ("YES" branch of block 718), process flow moves from operation 718 to operation 720.

In operation 420 of method 700, a layered shape is created on a map, such as GUI display 501 where hexagons 302 are layered over map 508. In some embodiments, the KPI geo-located data is geo binned. Binning, also called discrete binning or bucketing, is a data pre-processing technique used to reduce the effects of minor observation errors. The original data values which fall into a given small interval, a bin and are replaced by a value representative of that interval, which is often the central value. Binning is a form of quantization. In some embodiments, Spark component 204 performs the geo-binning.

Figure 8:
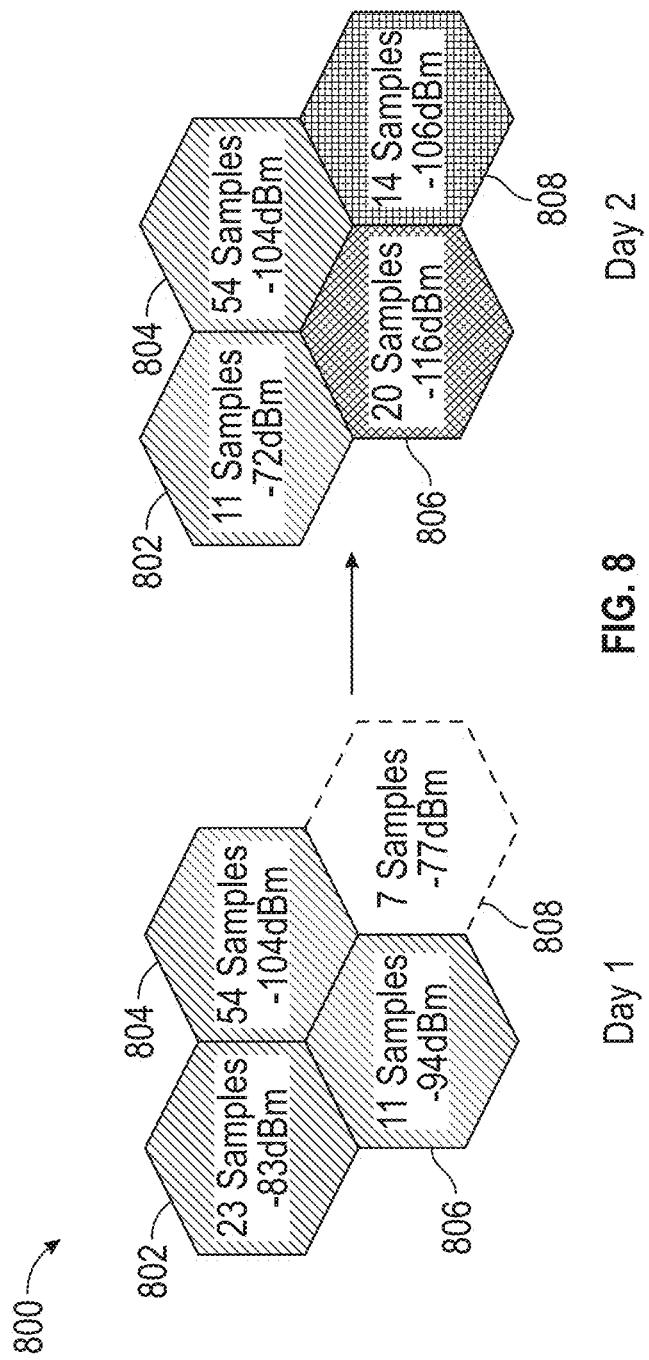
FIG. 8 is a pictorial representation of periodic layered shape presentation, in accordance with some embodiments.

FIG. 8 is a pictorial representation 800 of periodic layered shape presentation, in accordance with some embodiments.

In pictorial representation 800, on day 1 hexagon 802, includes 23 samples (which is greater than 10 samples) and an RSRP value of −83 dBm. Hexagon 804 includes 54 samples (which is greater than 10 samples) and an RSRP value of −104 dBm. Hexagon 806 includes 11 samples (which is greater than 10 samples) and an RSRP value of −94 dBm. Hexagon 808 includes 7 samples received (which is less than 10 samples) and an RSRP value of −77 dBm. As hexagon 808 has less than 10 samples, hexagon 808 is not created and remains off a display, such as display 501 (FIG. 5)

On day two, hexagon 802 includes 11 samples (which is greater than 10 samples) and a RRP value of −72 dBm. Hexagon 804 retains day one values as 8 samples (which is less than 10 samples) are collected on day 2 with a −84 dBm value received. Thus, day 2 values for hexagon 804 are not displayed and instead day 1 values for hexagon 804. Hexagon 806 includes 20 samples (which is greater than 10 samples) and an RSRP value of −116 dBm, which is displayed, but has changed in display as −116 dBm is a bad condition (see legend on FIG. 5). Hexagon 808 includes 14 samples (which is greater than 10 samples) and an RSRP value of −106 dBm. Day 2 hexagon 808 includes enough samples to create a layered hexagon shape that is displayed as average according to the RSRP value of −106 dBm.

FIG. 9 is a block diagram of a network visualization (NV) processing circuitry 900 in accordance with some embodiments. In some embodiments, NV processing circuitry 900 is a general-purpose computing device including a hardware processor 902 and a non-transitory, computer-readable storage medium 904. Storage medium 904, amongst other things, is encoded with, i.e., stores, computer program code 906, i.e., a set of executable instructions such as NV algorithm (e.g., a weighted average algorithm) and methods 400 and 700. Execution of instructions 906 by hardware processor 902 represents (at least in part) a network visualization application which implements a portion, or all of the methods described herein in accordance with one or more embodiments (hereinafter, the noted processes and/or methods).

Processor 902 is electrically coupled to a computer-readable storage medium 904 via a bus 908. Processor 902 is electrically coupled to an I/O interface 910 by bus 908. A network interface 912 is also electrically connected to processor 902 via bus 908. Network interface 912 is connected to a network 914, so that processor 902 and computer-readable storage medium 904 connect to external elements via network 914. Processor 902 is configured to execute computer program code 906 encoded in computer-readable storage medium 904 to cause network visualization processing circuitry 900 to be usable for performing a portion or all the noted processes and/or methods. In one or more embodiments, processor 902 is a Central Processing Unit (CPU), a multi-processor, a distributed processing system, an Application Specific Integrated Circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a Random Access Memory (RAM), a Read-Only Memory (ROM), a rigid magnetic disk, and/or an optical disk. In one or more embodiments using optical disks, computer-readable storage medium 904 includes a Compact Disk-Read Only Memory (CD-ROM), a Compact Disk-Read/Write (CD-R/W), and/or a Digital Video Disc (DVD).

In one or more embodiments, storage medium 904 stores computer program code 906 configured to cause NV processing circuitry 900 to be usable for performing a portion or all of the noted processes and/or methods. In one or more embodiments, storage medium 904 also stores information, such as NV algorithm which facilitates performing a portion or all the noted processes and/or methods.

Unified coverage processing circuitry 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

NV processing circuitry 900 also includes network interface 912 coupled to processor 902. Network interface 912 allows NV processing circuitry 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more unified coverage processing circuitry 900.

NV processing circuitry 900 is configured to receive information through I/O interface 910. The information received through I/O interface 910 includes one or more of instructions, data, design rules, libraries of standard cells, and/or other parameters for processing by processor 902. The information is transferred to processor 902 via bus 908. NV processing circuitry 900 is configured to receive information related to a UI through I/O interface 910. The information is stored in computer-readable medium 904 as User Interface (UI) 922.

In some embodiments, a method of network visualization that includes receiving key performance indicator (KPI) data inputs collected for nodes included in a Radio Access Network (RAN); filtering the KPI data to remove unreliable KPI data inputs; determining whether the KPI data inputs for a predetermined geographic area exceeds a threshold sample count; causing a graphical user interface (GUI) to be output by a user interface (UI), the GUI including a display of a shape, corresponding to the predetermined geographic area, layered over a map, where the shape represents an indication of network coverage quality, based on the filtered KPI data inputs, for a location corresponding to the shape corresponding to the predetermined geographic area.

In some embodiments, the filtering the KPI data to remove the unreliable KPI data inputs, further includes determining whether each KPI data input, corresponding with a node, corresponds with a node location within a threshold.

In some embodiments, the filtering the KPI data to remove the unreliable KPI data inputs, further includes determining whether each KPI data input includes a date-time tag.

In some embodiments, the filtering the KPI data to remove the unreliable KPI data inputs, further includes determining whether each KPI data input includes location tag.

In some embodiments, the filtering the KPI data to remove the unreliable KPI data inputs, further includes determining whether each KPI data input originates from an active node.

In some embodiments, the filtering the KPI data to remove the unreliable KPI data inputs, further includes determining whether each KPI data input includes a KPI tag.

In some embodiments, the method of network visualization further includes discarding a KPI data input, in response to the KPI data input not satisfying at least one of including a data-time tag; including a location tag; including a KPI tag; the KPI data input originates from an inactive node; or the KPI data input location being outside of a threshold.

In some embodiments, the indication of network coverage quality is based upon one or more of reference signal received power (RSRP); synchronization signal (SS) RSRP; signal to interference and noise ratio (SINR); SS-SINR; downlink rate; uplink rate; and latency.

In some embodiments, the indication of network coverage quality is represented as one of, in response to being within a first range, good; in response to being within a second range, average; and in response to being within a third range, bad.

In some embodiments, the method of network visualization further includes aggregating, in a weighted aggregation, multiple KPI data inputs from a first predetermined geographic area and a second geographic area, over a period of time, in response to receiving a input to create a larger map representation.

In some embodiments, an apparatus for network visualization that includes processor; and a memory having instructions stored thereon that, when executed by the processor, cause the apparatus to receive key performance indicator (KPI) data inputs collected for nodes included in a Radio Access Network (RAN); filter the KPI data to remove unreliable KPI data inputs; determine whether the KPI data inputs for a predetermined geographic area exceeds a threshold sample count; cause a graphical user interface (GUI) to be output by a user interface (UI), the GUI including a display of a shape, corresponding to the predetermined geographic area, layered over a map, where the shape represents an indication of network coverage quality, based on the filtered KPI data inputs, for a location corresponding to the shape corresponding to the predetermined geographic area.

In some embodiments, the instructions further cause the processor to determine whether each KPI data input, corresponding with a node, corresponds with a node location within a threshold.

In some embodiments, the instructions further cause the processor to determine whether each KPI data input includes a date-time tag.

In some embodiments, the instructions further cause the processor to determine whether each KPI data input includes a location tag.

In some embodiments, the instructions further cause the processor to determine whether each KPI data input originates from an active node.

In some embodiments, a non-transitory computer readable medium having instructions stored thereon that, when executed by a processor, cause an apparatus to receive key performance indicator (KPI) data inputs collected for nodes included in a Radio Access Network (RAN); filter the KPI data to remove unreliable KPI data inputs; determine whether the KPI data inputs for a predetermined geographic area exceeds a threshold sample count; cause a graphical user interface (GUI) to be output by a user interface (UI), the GUI including a display of a shape, corresponding to the predetermined geographic area, layered over a map, where the shape represents an indication of network coverage quality, based on the filtered KPI data inputs, for a location corresponding to the shape corresponding to the predetermined geographic area.

In some embodiments, the instructions further cause the processor to determine whether each KPI data input includes a KPI tag.

In some embodiments, the instructions further cause the processor to discard a KPI data input, in response to the KPI data input not satisfying at least one of include a data-time tag; include a location tag; include a KPI tag; the KPI data input originates from an inactive node; or the KPI data input location being outside of a threshold.

In some embodiments, the indication of network coverage quality is based upon one or more of reference signal received power (RSRP); synchronization signal (SS) RSRP; signal to interference and noise ratio (SINR); SS-SINR; downlink rate; uplink rate; and latency.

In some embodiments, the indication of network coverage quality is represented as one of, in response to being within a first range, good; in response to being within a second range, average; and in response to being within a third range, bad.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method of network visualization, the method comprising:
   receiving key performance indicator (KPI) data inputs collected for nodes included in a Radio Access Network (RAN);
   filtering the KPI data to remove unreliable KPI data inputs;
   determining whether the KPI data inputs for a predetermined geographic area exceeds a threshold sample count;
   causing a graphical user interface (GUI) to be output by a user interface (UI), the GUI comprising:
      a display of a shape, corresponding to the predetermined geographic area, layered over a map, where the shape represents an indication of network coverage quality, based on the filtered KPI data inputs, for a location corresponding to the shape corresponding to the predetermined geographic area.

2. The method of network visualization of claim 1, wherein the filtering the KPI data to remove the unreliable KPI data inputs, further comprises:
   determining whether each KPI data input, corresponding with a node, corresponds with a node location within a threshold.

3. The method of network visualization of claim 1, wherein the filtering the KPI data to remove the unreliable KPI data inputs, further comprises:
   determining whether each KPI data input includes a date-time tag.

4. The method of network visualization of claim 1, wherein the filtering the KPI data to remove the unreliable KPI data inputs, further comprises:
   determining whether each KPI data input includes location tag.

5. The method of network visualization of claim 1, wherein the filtering the KPI data to remove the unreliable KPI data inputs, further comprises:
   determining whether each KPI data input originates from an active node.

6. The method of network visualization of claim 1, wherein the filtering the KPI data to remove the unreliable KPI data inputs, further comprises:
   determining whether each KPI data input includes a KPI tag.

7. The method of network visualization of claim 1, further comprising:
   discarding a KPI data input, in response to the KPI data input not satisfying at least one of:
      including a data-time tag;
      including a location tag;
      including a KPI tag;
      the KPI data input originates from an inactive node; or
      the KPI data input location being outside of a threshold.

8. The method of network visualization of claim 1, wherein the indication of network coverage quality is based upon one or more of:
   reference signal received power (RSRP);
   synchronization signal (SS) RSRP;
   signal to interference and noise ratio (SINR);
   SS-SINR;
   downlink rate;
   uplink rate; and
   latency.

9. The method of network visualization of claim 1, wherein the indication of network coverage quality is represented as one of:
   in response to being within a first range, good;
   in response to being within a second range, average; and
   in response to being within a third range, bad.

10. The method of network visualization of claim 1, further comprising:
    aggregating, in a weighted aggregation, multiple KPI data inputs from a first predetermined geographic area and a second geographic area, over a period of time, in response to receiving a input to create a larger map representation.

11. An apparatus for network visualization, the apparatus comprising:
    a processor; and
    a memory having instructions stored thereon that, when executed by the processor, cause the apparatus to:
       receive key performance indicator (KPI) data inputs collected for nodes included in a Radio Access Network (RAN);
       filter the KPI data to remove unreliable KPI data inputs;
       determine whether the KPI data inputs for a predetermined geographic area exceeds a threshold sample count;
       cause a graphical user interface (GUI) to be output by a user interface (UI), the GUI comprising:
          a display of a shape, corresponding to the predetermined geographic area, layered over a map, where the shape represents an indication of network coverage quality, based on the filtered KPI data inputs, for a location corresponding to the shape corresponding to the predetermined geographic area.

12. The apparatus for network visualization of claim 11, wherein the instructions further cause the processor to:
    determine whether each KPI data input, corresponding with a node, corresponds with a node location within a threshold.

13. The apparatus for network visualization of claim 11, wherein the instructions further cause the processor to:
    determine whether each KPI data input includes a date-time tag.

14. The apparatus for network visualization of claim 11, wherein the instructions further cause the processor to:
    determine whether each KPI data input includes a location tag.

15. The apparatus for network visualization of claim 11, wherein the instructions further cause the processor to:
    determine whether each KPI data input originates from an active node.

16. A non-transitory computer readable medium having instructions stored thereon that, when executed by a processor, cause an apparatus to:
    receive key performance indicator (KPI) data inputs collected for nodes included in a Radio Access Network (RAN);

filter the KPI data to remove unreliable KPI data inputs;
determine whether the KPI data inputs for a predetermined geographic area exceeds a threshold sample count;
cause a graphical user interface (GUI) to be output by a user interface (UI), the GUI comprising:
 a display of a shape, corresponding to the predetermined geographic area, layered over a map, where the shape represents an indication of network coverage quality, based on the filtered KPI data inputs, for a location corresponding to the shape corresponding to the predetermined geographic area.

17. The non-transitory computer readable medium of claim 16, wherein the instructions further cause the processor to:
 determine whether each KPI data input includes a KPI tag.

18. The non-transitory computer readable medium of claim 16, wherein the instructions further cause the processor to:
 discard a KPI data input, in response to the KPI data input not satisfying at least one of:
  include a data-time tag;
  include a location tag;
  include a KPI tag;
  the KPI data input originates from an inactive node; or
  the KPI data input location being outside of a threshold.

19. The non-transitory computer readable medium of claim 16, wherein the indication of network coverage quality is based upon one or more of:
 reference signal received power (RSRP);
 synchronization signal (SS) RSRP;
 signal to interference and noise ratio (SINR);
 SS-SINR;
 downlink rate;
 uplink rate; and
 latency.

20. The non-transitory computer readable medium of claim 16, wherein the indication of network coverage quality is represented as one of:
 in response to being within a first range, good;
 in response to being within a second range, average; and
 in response to being within a third range, bad.

* * * * *